Jan. 29, 1957 P. MAURICE ET AL 2,779,281
GAS GENERATOR
Filed Aug. 1, 1950
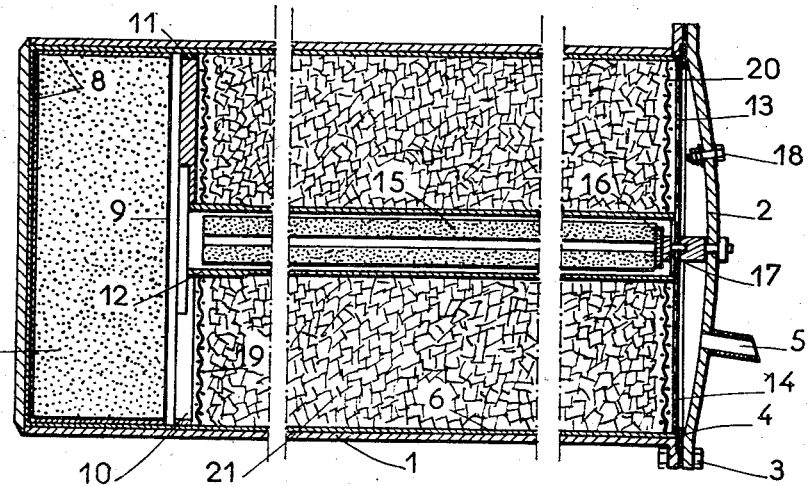
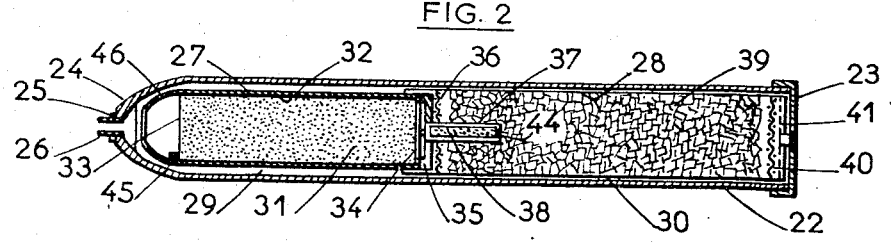
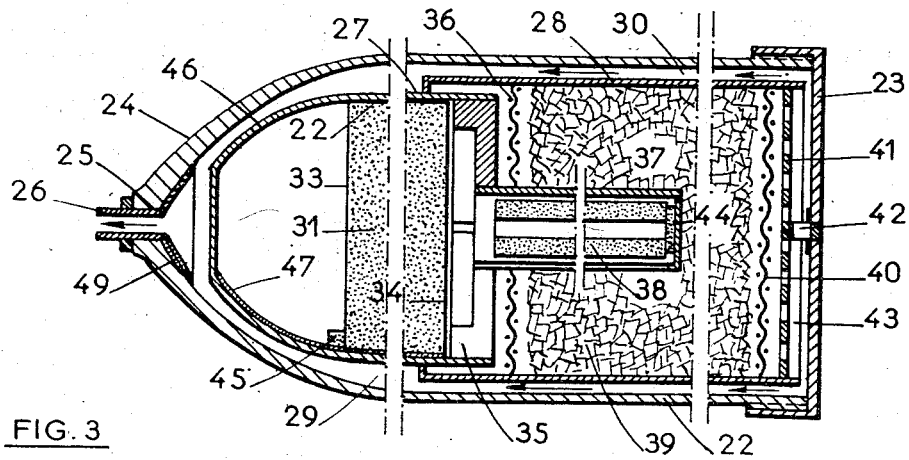
INVENTORS
Pierre MAURICE
Paul TAVERNIER
by Jewett, Mead
& Browne
ATTORNEYS United States Patent Office 2,779,281
Patented Jan. 29, 1957

2,779,281
GAS GENERATOR

Pierre Maurice, Sevran, and Paul Tavernier, Vaujours, France, assignors to French State represented by the Ministry of National Defense Application August 1, 1950, Serial No. 176,976

Claims priority, application France August 3, 1949

10 Claims. (Cl. 102—39)

Our invention relates to methods and means for producing gases under pressure and chiefly to such methods and means that are used for producing large amounts of gas under pressure during comparatively short periods. This is the case in particular when it is desired to produce gases for injecting liquid into a rocket, for feeding turbines, for starting turbo-machines, for catapulting aerials or submarine machines, for atomizing liquid for various purposes, for the emergency feed of various arrangements etc.

It has already been proposed to use for the purposes disclosed hereinabove gases formed during exothermic reactions in particular through the combustion of a solid or liquid substance that may be simple or formed by mixing before its use or otherwise, and chiefly of gun powder.

In the particular embodiments of said method, difficulties are, however, met by reason of the extremely high temperature of formation of the gases that may reach 1800 to 2000° C.

Now, for the feeding of turbines the gases should not reach a temperature higher than about 800 to 900° C. For injection of certain liquids into a rocket, they should not rise beyond 200 to 250° C. etc.

It is, therefore, essential in practice to provide in those cases for a cooling of the gases before use.

My invention has for its object to allow the execution of the cooling in a manner such that the temperature of the gases at the moment of their use may reach the desired predetermined value that should be practically independent of the local conditions in which the actual gases are produced, such as the external temperature, the position of the machine on which the gases are produced, the acceleration to which said machine may be submitted etc.

Our invention has also for its object the cooling of gases under the most advantageous conditions as far as energy is concerned, through the agency of comparatively simple, light, cheap, small bulk arrangements.

For this purpose, our invention consists primarily in resorting to the high gas temperatures due to the original reaction in order to produce a physical, chemical or physico-chemical phenomenon which produces as a secondary reaction further gases that mix with the primary gases, said production of further gases leading, consequently, to the desired reduction in temperature of the whole mass of gases.

In the case where the secondary reaction produces a lowering of temperature that is too considerable as concerns the object sought for, the low temperature gases obtained as described hereinabove, may be admixed in accordance with our invention with other high temperature gases obtained through the primary reaction and that have not been used for the secondary reaction, the proportions of the mixture being adjusted in a manner such that said mixture may reach the final temperature desired.

We may mention among the physico-chemical reactions that may be used as disclosed hereinabove, in accordance with our invention, the following: the decomposition of the hydrates of a compound adapted to crystallize with a large number of water molecules such as calcium or magnesium chloride or sodium phosphate. Such hydrates are decomposed, as a matter of fact, at a moderate temperature, whereas the anhydrous body is stable at a high temperature. The secondary gases formed are then constituted simply by steam; the evaporation and/or decomposition through heat of a solid compound that may be partly or wholly dissociated into gases with an absorption of heat, said compound being constituted by ammonium chloride, hydrated or non-hydrated oxalic acid, ammonium oxalate, ammonium acetate, urea, ammonium carbonate and the like; the evaporation of a liquid product, such as water, alcohol, formic acid and the like; the release, under the action of heat, of gases or liquids absorbed by a substance such as active carbon or the like.

In practice, the products that are adapted to provide the secondary reaction, are carried inside a cartridge communicating with the chamber inside which the high temperature gases are produced, the arrangement of said products being such in said cartridge, that the secondary reaction may be executed in a smooth manner.

Thus, when the substances intended for the production of secondary reactions are constituted by solid material, they may be used, in conformity with our invention, either directly in the shape of granular particles of suitable size and shape or else in the shape of a mass provided with channels or else they are dispersed inside a porous material such as sponges, pumice stone, charcoal or the like.

When the substances appear, on the contrary, in the form of a liquid such as water, alcohol or the like, they may be transformed into a solid form through the addition of some gelatinizing material and/or through absorption by a porous material.

In this latter case, the material thus assuming a solid form, may contain dissolved gases or solid compounds of the kind referred to hereinabove and adapted to produce gases under the action of heat.

It is also possible to provide for a combination of the different reactions mentioned hereinabove through mixtures of various substances referred to.

Further objects and features of our invention will appear in the reading of the following description, reference being made to accompanying drawings, illustrating by way of example and by no means in a limiting sense, two preferred embodiments of our invention. In said drawings:

Fig. 1 is a cross-sectional view of an arrangement for producing gases that are to serve for ejecting liquids into a rocket, said gases being produced under a pressure of 50 kg. per sq. cm. at a temperature of about 180° C., the gas output being equal to about 6 litres per second during 10 seconds.

Fig. 2 is a cross-sectional diagram illustrating an arrangement for producing gases at a temperature of about 750° C. for feeding a turbine.

Fig. 3 is a cross-section, on a larger scale, of the main parts forming the said arrangement.

In Fig. 1, 1 designates a casing of a light metal such as an aluminum alloy adapted to contain the gas-producing means. This casing is closed at its front end by a cover 2 that is secured through bolts 3 with the interposition of packings 4. 5 designates the outlet pipe carried by the cover 2 and serving for the outlet of the gases.

Inside the casing 1 is arranged a heat-insulating lining 6 constituted by a sheet of asbestos impregnated with rubber. At the rear of the casing 1 is located a block of powder 7 the combustion of which is to produce gases under pressure at a high temperature. This block of powder may have a nitroglycerin base and assume the following composition:

| | Percent |
|---|---|
| Nitrocellulose containing 11.7% of nitrogen | 66 |
| Nitroglycerin | 25 |
| Diethyldiphenylurea | 8.75 |
| Petroleum jelly | 0.25 |

This block is lined on its lateral and rear surfaces by an inhibitor varnish layer 8 that is to isolate it with reference to the casing 1. Said varnish prevents the combustion of the powder from reaching the surfaces coated thereby so that the powder may burn only through its uncoated front surface 9. In front of said surface 9 is arranged a centering member 10 constituted by a plurality of steel arms connected peripherally by an annular element 11 and the inner ends of which are rigid with a tube 12 extending to the front end of the casing where it is secured to a plate 13 provided with openings 14.

Inside the tube 12 is arranged a block of powder 15 assuming a tubular shape and the composition of which is the same as that of the block 7. Said block is not coated with varnish and consequently may burn over the whole extent of its outer surface. Its front end is associated with a small igniting bag 16 constituted by a few grams of gunpowder adapted to be ignited in its turn by an electric igniter 17 connected with terminals 18 carried by the cover 2. The centering member 10 is covered by a metal screen 19 impregnated with cellulose acetate while the grating 13 is associated with a further metal screen 20 of the same type also impregnated with cellulose acetate.

Inside the tubular space defined between the inner wall of the casing lining 6 and the outer wall of the tube 12 on one hand and between the screens 19 and 20 on the other hand, is inserted a cooling charge 21 constituted by charcoal impregnated with calcium chloride saturated with water. It should be remarked that the screen 19 is spaced with reference to the wall 9 of the powder block 7 by an empty space wherein the gases are allowed to evolve as soon as they pass out of the said block 7.

The operation of the above arrangement is as follows:

When the ignition bag is ignited through the passage of an electric current at 17, the surface of the auxiliary powder block 15 burns rapidly and the combustion is propagated throughout the block. The pressure rises rapidly until it reaches the figure of 50 kg. per sq. cm. required, by reason of the combustion of this auxiliary block, after which normal production of gases is ensured through the main block 7 the ignition of which is produced immediately upon ignition of the auxiliary block 15. The pressure of the gases rises thus and as said gases cannot pass out of the rear of the casing enclosing the charge 15 that remains closed, the gases find their way into the chamber 21 as disclosed hereinafter.

At the moment of the rise in pressure, the acetate of cellulose laid on the screens 19 and 20 tears open and allows the gases to pass through the cooling charge 21. Said gases dehydrate gradually the entire cooling charge of charcoal and pass out of the arrangement at a temperature of 180° C. with a saturating amount of steam. As the gases are issuing at a temperature of 180° C., the outer casing 1 does not risk being submitted to any exaggerated temperature and it may consequently be made as stated of a light alloy.

The arrangement illustrated in Figs. 2 and 3 is intended for the feeding of a turbine of 150 H. P. for one minute with gases at a temperature of about 750° C. Said arrangement is constituted by an outer casing 22 of duralumin assuming the shape of a cylinder having a cover 23 the front end of which 24 is ogee-shaped. At the end of said terminal ogee there is provided a port 25 inside which is fitted a pipe 26 for the exhaust of the gases.

Inside the outer casing 22 is housed a steel casing constituted by two elements arranged endwise, 27 and 28, the outer diameter of which is less than the inner diameter of the casing 22 so as to provide annular clearances 29 and 30 therebetween. The centering of the inner casing 27, 28 inside the outer casing 22 is provided through any suitable centering means that is not illustrated, such as welded ribs. The element 27 of the inner casing is adapted to receive the cylindrical powder block 31. The periphery of this block is coated with an inhibitor varnish 32 while its transverse surfaces 33 and 34 are free. To the rear of said latter surface 34 is located, as in the case of Fig. 1, a centering member 35 on which a metal screen 36 bears, that is coated with cellulose acetate and that carries, furthermore, a tube 37 similar to the tube 12 of Fig. 1 and adapted to contain a tubular block of powder 38, similar to the block 15 of Fig. 1.

Inside the casing 28 and to the rear of the screen 36, is housed the cooling charge 39 constituted by charcoal, impregnated with calcium chloride saturated with water. This charge is held at its rear end by a metal screen 40 coated with acetate of cellulose similar to the screen 20 of the arrangement of Fig. 1, said screen bearing on a grating 41 similar to the grating 13 illustrated in Fig. 1.

Said grating 41 is located at a small distance from the rear closure 23 and is separated therefrom by a spacing member 42 so as to form a free space 43 therebetween. To the rear closure 23 are secured electric terminals not illustrated that feed current through wires, not illustrated, to the ignition cartridges 44 and 45 that serve respectively on one hand for igniting the block of powder 38 and consequently the surface 34 of the block 31 and on the other hand, for igniting the surface 33 of the block 31.

The front of the steel tube or sheath 27 ends under the form of an ogee 46 positioned at a distance to the rear of the above mentioned ogee 24 and inside same, the outer wall of said ogee 46 being coated with an inhibiting varnish 47. Furthermore, the inside of the ogee 24 arranged in the vicinity of the opening 25 is also coated with an inhibitor varnish 49.

The above described arrangement operates as follows:

The simultaneous firing through electric means of the small cartridges 44 and 45 being proceeded with, the latter ignite simultaneously the block 38 and the surfaces 33 and 34 of the block 31.

The heat produced by this rapid combustion of the block 38 has for its result, as in the case of Fig. 1, a rise of the pressure and temperature inside the charge 39. The normal rate of smooth burning of the powder is ensured through the combustion of the powder block 31 through its surface 34.

At the moment at which the pressure begins to rise, the acetate of cellulose coated on the screens 36 and 40 tears and provides a passage for the combustion gases issuing from the surface 34 of the powder block 31. As these gases pass through the cooling charge and produce secondary gases inside said charge, the temperature of the combustion gases that was originally equal to 1800° C. is lowered down to about 180° C. The gases escape through the grating 41 into the space 43 and sweep over the bottom of the outer cover after which they flow back over the inner wall of said casing through the open annular spaces 30 and 29 until they reach the end of the ogee 46. At this latter point, the gases mix with further hot gases produced by the combustion of the surface 33 of the powder block, said gases being substantially at a temperature of 1800° C. As a consequence of this mixing, the average temperature of the gases passing out of the port 26 is equal to about 750° C., i. e. the temperature that is desirable for the feeding of a turbine.

It should be noticed that the outer casing of the arrangement is in contact only with gases the temperature of which is less than 200° C. whereby it is possible for said casing to be made without any drawback of a light alloy as disclosed hereinabove.

The above described arrangement shows the advantage of operating without any moving mechanical means while assuming a cylindrical symmetry that provides for a regular distribution of the temperatures and of the stresses.

In the arrangement disclosed, the operation is ensured by mixing the gases produced by the combustion of both surfaces of a same block of powder, the gases produced by one surface being cooled through the passage through a cooling charge and thenafter mixed with the hot gases from the other surface.

It is also possible, according to our invention, to provide for the simultaneous combustion of two different powder blocks burning each through only one surface, the gases produced through the combustion of one of the blocks being mixed with those produced through the combustion of the other block, after the latter has passed through a cooling charge. However, the use of a single charge burning throughout two opposed surfaces, leads obviously to a combustion beginning on both surfaces and coming simultaneously to an end, which is preferable.

Furthermore, instead of providing for an average final temperature of 750° C. and when it is desired to obtain a higher or a lower final temperature, it is sufficient to produce a smaller or greater amount of cool gases with reference to the amount of uncooled gases. This result may be readily obtained in accordance with our invention through the use of unequal combustion surface areas on the powder block or blocks for the production of cooled or uncooled gases, in other words, we may resort for instance to the use of cylindrical powder blocks of unequal cross-sectional areas. Obviously, numerous modifications may be made to the arrangement described without unduly widening the scope of the present invention as defined in accompanying claims.

In particular, instead of resorting to charcoal impregnated with water-saturated calcium chloride, experience has shown that it is possible to obtain highly interesting results through the use of ammonium bicarbonate assuming the shape of one or more blocks obtained through compression with a slight percentage of agglomerating material, say 3% of paraffin for instance. It may be of advantage to use said charge in the form of a block having a contact surface with the gases that is constant throughout operation, a cylindrical block being axially perforated for instance for this purpose.

What we claim is:

1. An arrangement for produing a propulsive stream of compressed gases at a high predetermined temperature, comprising an elongated tubular casing including a front ogee-shaped portion with a central opening in the latter, a diaphragm adapted to open at raised temperature, extending at least over part of the cross-section of the casing, a forwardly open chamber to the front of said diaphragm the side wall of which defines an annular gap with the inner surface of the casing, a charge of explosive material held in said chamber, extending throughout its breadth and having a front surface lying behind the front opening of the chamber and a rear surface spaced with reference to the front of the diaphragm, a second diaphragm adapted to open at raised temperature, extending across a part of the cross-section at the rear end of the casing, a cylindrical wall connecting the two diaphragms to form a closed compartment therewith, and separated from the inner surface of the casing by a gap opening into the just mentioned gap, a solid mass of porous dissociatable material is said closed compartment for evolving a large amount of gases at raised temperatures, and means for igniting the charge of explosive material to produce a first primary mass of gases passing outwardly directly through the front openings in the chamber and in the casing, and a second mass of primary gases between the rear surface of the charge and the first diaphragm that provides for the passage of said second mass of primary gas through the solid mass in the closed compartment to carry along with it the gases evolved therein through the open second diaphragm and back through the gap between the inner wall of the casing, the cylindrical wall of the compartment and the side wall of the chamber into the opening at the front of the casing.

2. An arrangement for producing a propulsive stream of compressed gases at a high predetermined temperature comprising an elongated tubular casing provided with an axial opening at its front end, an inner substantially cylindrical partition lying at a small distance from the inner wall of the casing throughout the extent thereof and opening in register with the opening in the casing and the rear end of which partition is open and leaves a clearance between it and the rear end of the casing, the cylindrical space defined inside the partition communicating freely beyond the rear end of the partition with the annular gap between said partition and the inner wall of the casing, two diaphragms extending respectively across the medial portion and the rear end of the cylindrical partition and adapted to open upon application of heat, said diaphragms defining a first compartment between them and a second compartment to the front of the front diaphragm, a mass of explosive material in the second compartment and having a front surface at a small distance behind the front opening of the wall and a rear surface at a small distance in front of the front diaphragm, means for igniting said charge to produce two masses of gases through combustion of said mass along its front and its rear surfaces respectively, and a mass of porous dissociatable material evolving a large amount of gases at raised temperature and located in the first compartment, the said mass being dissociated by the heat evolved by the gases formed at the rear of the first compartment, to form a secondary stream of gases, said last stream of gases admixed with the gases from the rear surface of the explosive charge, being adapted to pass out of the rear end of the cylindrical partition into the gap separating the inner wall of the casing from the partition and out of the casing with the mass of gases from the front surface of the charge of explosive material.

3. An arrangement for producing a propulsive stream of compressed gases at a high predetermined temperature, comprising an elongated tubular casing, an outlet pipe at the rear end thereof, a diaphragm collapsing at raised temperature and extending across the casing, a charge of explosive material to the front of said diaphragm with a clearance between its rear surface and the front surface of the diaphragm, means for igniting said charge passing axially through the rear part of the casing and through the diaphragm into proximity with said charge, a partition surrounding said igniting means and leaving an opening at its front end, a filling of porous solid dissociatable material evolving a large amount of gases when submitted to the heat of the gases evolved by the combustion of the charge and entering said filling upon collapse of the diaphragm heated by said gases, a second diaphragm extending across the casing slightly to the front of the rear end thereof and forming a cover for the rear end of last mentioned dissociatable filling and adapted to collapse under the action of the heat produced by the stream of combustion gases admixed with the gases evolved by the dissociatable material, said last mentioned stream passing beyond said second diaphragm, when collapsed, into the outlet pipe.

4. An arrangement for producing a propulsive stream of compressed gases at a high predetermined temperature, comprising an elongated tubular casing, an outlet pipe at the rear end thereof, a diaphragm collapsing at raised temperature and extending across the casing, a charge of explosive material to the front of said diaphragm with a clearance between its rear surface and the front surface of the diaphragm, means for igniting said charge passing through the diaphragm into proximity with said charge, a partition surrounding said igniting means and leaving an opening at its front end, a filling of porous solid dissociatable material evolving a large amount of gases when submitted to the heat of the gases evolved by the combustion of the charge and entering said filling upon collapse of the diaphragm heated by said gases, a second diaphragm extending across the casing slightly to the front of the rear end thereof and forming a cover for the rear end of last mentioned dissociatable filling and adapted to collapse under the action of the heat produced by the stream of combustion gases admixed with the gases evolved by the dissociatable material, said last mentioned stream passing beyond said second diaphragm, when collapsed, into the outlet pipe, and by-pass means for diverting a fraction of the stream of combustion gases directly to the output channel laterally of the dissociatable filling.

5. An arrangement for producing a propulsive stream of compressed gases at a high predetermined temperature, comprising a casing containing two separate and distinct masses defining between them a gap and constituted respectively by purely explosive material and by a porous solid material, dissociatable at a high temperature, a diaphragm extending throughout said gap and the major part of which is constituted by material adapted to decompose upon application of heat, an igniter associated with the first mass, the gases produced by the combustion of the first mass being adapted to impinge on the second mass to evolve gases out of the latter for admixture therewith, a diaphragm extending inside the casing beyond the second mass with reference to the first mass and made at least partly of material decomposable by the heat of the hot mixture of gases produced behind it, and an outlet for the mixture of gases beyond said second diaphragm.

6. An arrangement for producing a propulsive stream of compressed gases at a high predetermined temperature, comprising a casing, a mass of purely explosive material filling part of said casing, a mass of porous solid non-collapsible heat-resisting carrier material impregnated with a dissociatable substance adapted to evolve gases when heated, said mass filling also part of the casing, the two masses facing each other throughout substantially the entire cross-section of the casing, an igniter adapted to act on the surface of the explosive mass facing the heat-resisting mass, means separating the cooperating surface of the explosive material and of the porous mass and adapted to collapse when submitted to the heat of combustion of the explosive material to allow at least part of the gases produced by said charge to enter the porous mass and dissociate the substance impregnating the latter and means whereby the mixture of combustion gases and of gases formed through dissociation of said substance passes out of the casing.

7. An arrangement for producing a propulsive stream of compressed gases at a high predetermined temperature, comprising a casing subdivided into two juxtaposed compartments, a charge of purely explosive material adapted to produce a large volume of primary gases at a very high temperature and contained in the first compartment, a porous mass of solid material resisting the action of the hot primary gases, contained in the second compartment, said porous mass extending substantially throughout the cross-section of the casing facing the charge in said first compartment, igniting means for the explosive charge adapted to act on said charge at a point registering with the porous mass, said porous mass comprising a substance adapted to form upon dissociation by heat a large amount of gases, a diaphragm separating the two compartments and adapted to open through decomposition upon combustion of the explosive material in the first compartment to provide thereby for the passage of the gases produced by the said combustion into the second compartment and for the evolution of the secondary gases through dissociation of the dissociatable substance, and an output channel connected with the second compartment and adapted to convey the stream of combustion gases admixed with the gases evolved by the dissociatable material.

8. An arrangement for producing a propulsive stream of compressed gases at a high predetermined temperature, comprising a casing, a mass of purely explosive material filling one end of said casing, a porous support resisting the action of the hot gases produced by the explosive of said charge and filling the other end of the casing and leaving a narrow transverse gap between it and the explosive charge, a substance adapted to evolve large amounts of gases at a raised temperature and incorporated in said support, an igniter associated with a point of the explosive charge facing the porous mass, and an outlet pipe opening into the casing beyond the location of porous support with reference to the explosive charge and adapted to collect the mixture of gases produced.

9. An arrangement for producing a propulsive stream of compressed gases at a high predetermined temperature, comprising a casing, an explosive charge filling one portion of the casing, a porous support adapted to resist the action of the explosive gases evolved by said charge, filling another portion of the casing and extending substantially throughout the cross-section of said casing and leaving a gap between it and the explosive charge, igniters associated with a point of said explosive charge near the said gap and with a point of the latter facing away from the said gap, a dissociatable substance carried in the pores of the porous support and adapted to evolve when heated a large amount of gases, the gases produced by the combustion of the explosive charge being adapted to impinge on the porous support to evolve gases out of the substance carried by the latter, an outlet pipe beyond the location of the explosive charge with reference to the porous support and adapted to collect the combustion gases evolved through the surface of the explosive charge facing the outlet pipe and by-pass means wherethrough the combustion gases passing through the porous support and admixed with the gases evolved by the dissociatable substance are fed in said outlet pipe.

10. An arrangement for producing a propulsive stream of compressed gases at a high predetermined temperature comprising a casing, a first mass of explosive material mounted within said casing, a second mass of material mounted within said casing in spaced relation to said first mass to define a gap therebetween, said second mass comprising a porous support carrying a substance adapted to evolve large amounts of gases at raised temperature, an auxiliary mass of explosive material extending axially from said gap into said second mass, an igniter mounted within said casing in operative relationship with said auxiliary mass, means for directing gases produced by the combustion of said first mass into impingement upon said second mass to evolve gases from said second mass for admixture with the gases produced by the combustion of said first mass, and an outlet pipe extending through said casing for releasing gases from the interior of said casing.

References Cited in the file of this patent

UNITED STATES PATENTS

| | | |
|---|---|---|
| 671,708 | Noble | Apr. 9, 1901 |
| 931,135 | Maxim | Aug. 17, 1909 |
| 1,187,779 | Patten | June 20, 1916 |

FOREIGN PATENTS

| | | |
|---|---|---|
| 474,717 | France | Dec. 22, 1914 |
| 734,519 | France | Aug. 1, 1932 |
| 445,101 | Italy | Feb. 8, 1949 |